June 18, 1935.　　　O. WITTEL　　　2,005,405
PHOTOGRAPHIC FILM CARTRIDGE AND SPOOL FOR USE THEREIN
Filed July 13, 1932　　2 Sheets—Sheet 1
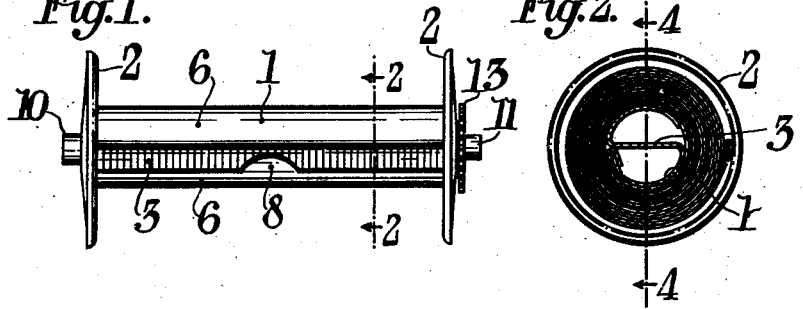
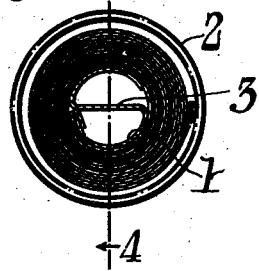
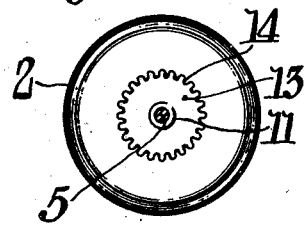
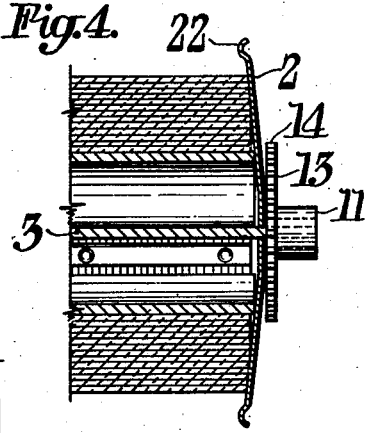
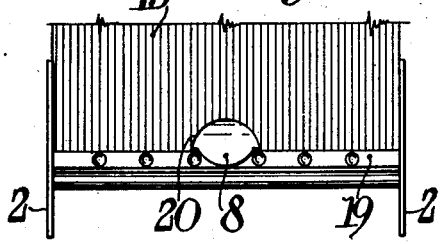
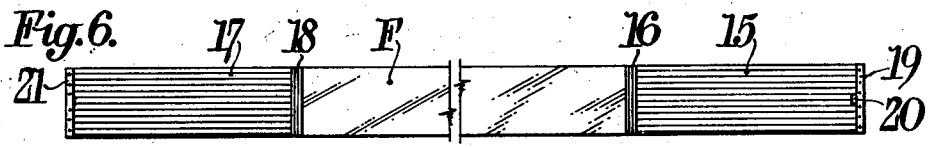
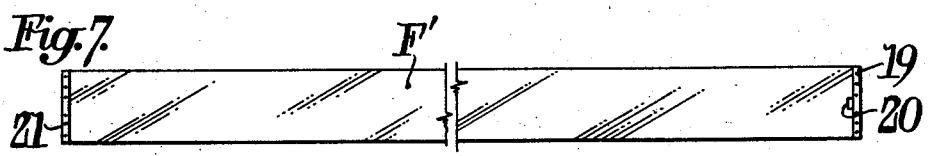
Inventor:
Otto Wittel,
By Donald H. Stewart,
Newton M. [illegible]
Attorneys June 18, 1935.  O. WITTEL  2,005,405
PHOTOGRAPHIC FILM CARTRIDGE AND SPOOL FOR USE THEREIN
Filed July 13, 1932  2 Sheets-Sheet 2
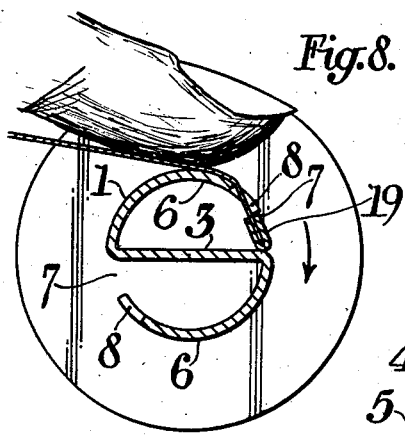
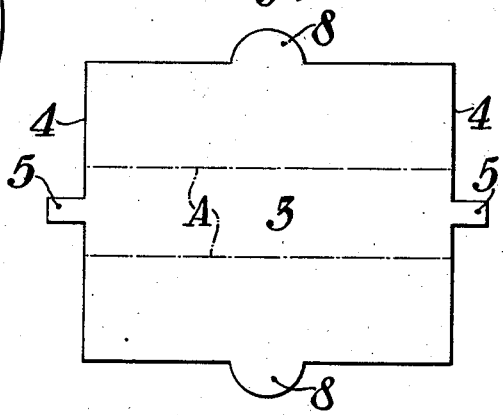
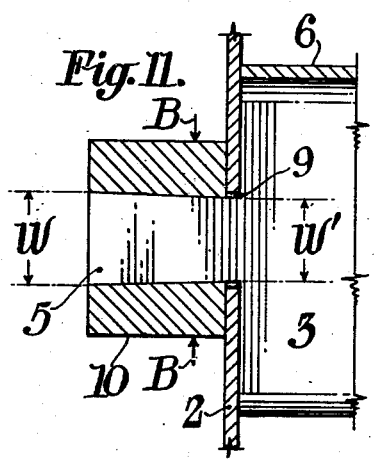
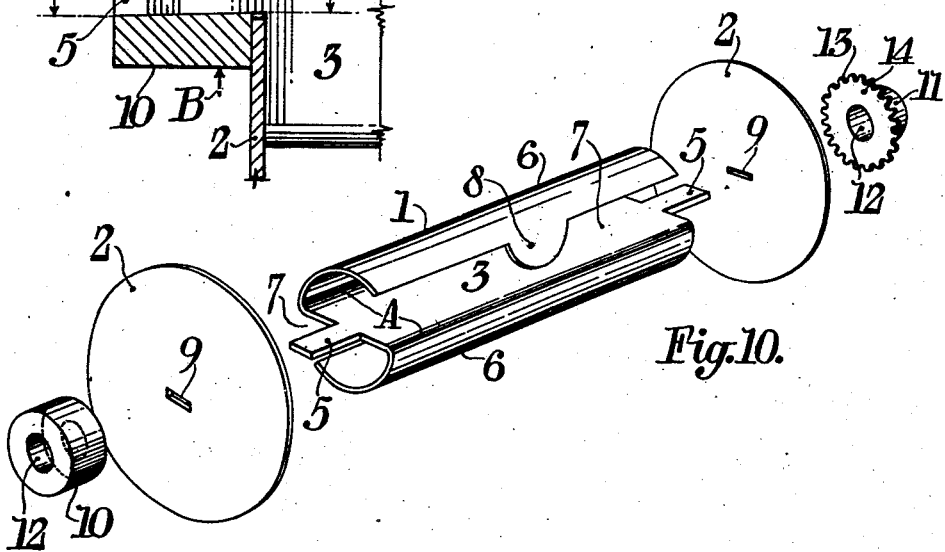
Inventor:
Otto Wittel,
Donald H. Stewart,
By Newton M. Lewis
Attorneys.

Patented June 18, 1935

2,005,405

UNITED STATES PATENT OFFICE 2,005,405

PHOTOGRAPHIC FILM CARTRIDGE AND SPOOL FOR USE THEREIN

Otto Wittel, Rochester, N. Y., assignor to Eastman Kodak Company, Rochester, N. Y., a corporation of New York Application July 13, 1932, Serial No. 622,298

13 Claims. (Cl. 242—71)

This invention relates to photography and more particularly to photographic film spool cartridges. One object of my invention is to provide a photographic film cartridge in which convolutions of film and protective material are wound upon a film spool. Another object of my invention is to provide a removable connection between the end of a film band and the hub of a film spool to facilitate winding film upon the spool. Another object of my invention is to provide a film spool which can be readily loaded without thrusting film through a slot therein as is customary in this art. Another object of my invention is to provide a photographic film cartridge in which the strip material is accurately located with respect to a film spool. Another object of my invention is to provide a film spool which is simple in construction and which is particularly suitable for carrying film of the new small dimensions. Still another object of my invention is to provide an all-metal film spool in which the several parts are held together without the use of soldering or welding. Another object of my invention is to provide a film spool in which the hub is extremely strong and resists torsional stresses. Still another object of my invention is to provide a film spool with a special type of flange which cooperates with a special type of backing paper to facilitate loading and unloading a camera and other objects will appear from the following specification, the novel features being particularly pointed out in the claims at the end thereof.

Coming now to the drawings wherein like reference characters denote like parts throughout:

Fig. 1 is a side elevation of a photographic film spool constructed in accordance with and embodying a preferred form of my invention.

Fig. 2 is a section on line 2—2 of Fig. 1.

Fig. 3 is an end elevation of the film spool shown in Fig. 1.

Fig. 4 is an enlarged sectional detail view of a portion of the film spool shown in Fig. 1.

Fig. 5 is a plan view of strip material being attached to the film spool shown in Fig. 1.

Fig. 6 illustrates one type of film band on a much smaller scale than the other figures which may be wound into a film cartridge in accordance with my invention.

Fig. 7 shows a second type of film band on a much smaller scale than the other figures which may be used.

Fig. 8 is an enlarged sectional view showing the end of a film band being attached to a film spool constructed in accordance with the showing of Fig. 1.

Fig. 9 shows an unformed blank from which the core of the film spool shown in Fig. 1 may be formed.

Fig. 10 is a perspective exploded view of the several parts which, when assembled, produce a spool as shown in Fig. 1.

Fig. 11 is a greatly enlarged fragmentary sectional view through a film spool trunnion.

The present tendency in roll holding cameras is to make cameras more and more compact and cameras which use small size film. A large number of cameras are constructed to use either perforated or unperforated 35 mm. film which is ordinary standard size for motion picture work.

Such small film in small cameras makes loading far more difficult than with the better known sizes of film and makes it necessary to provide an extremely small and light-weight film spool. With the parts of such reduced size, it is difficult, if not imposible, to thread the film spools in the usual manner by thrusting the end of the film or film backing paper through a slot in the film spool hub. It is also desirable that some means be provided for sealing the film spool after the film has been completely exposed, because the spool flanges are necessarily of small diameter and the film must be held tightly on the spool in order to avoid fogging.

My invention is particularly directed to producing a film spool cartridge including a film spool which will overcome these usual difficulties.

Accordingly, in Fig. 1 I have illustrated at approximately twice the normal size a preferred form of film spool which may be used in a cartridge constructed in accordance with my invention.

As shown in Fig. 1, the spool may consist of a hub member 1 to which flanges 2 may be permanently attached. Referring to Figs. 9 and 10, in order to provide a film spool core of thin gauged metal which will not become distorted or will not twist under the usual winding stresses, I prefer to prepare a core from a blank as shown in Fig. 9. This blank may consist of a central rectangular portion 3 defined by the dot and dash lines A and the walls 4. In the central part of this rectangular plate, I prefer to provide two tongues 5.

By bending the blank along the lines A, there remains a central, flat, rectangular plate 3 with arcuate walls 6 bent into substantially the form of a cylinder. Since the metal is of insufficient length to form a complete cylinder, this leaves two slots 7—7 diametrically opposite to each other. Extending partially into each slot is a hook-shaped lug 8 which is also integral with the arcuate walls 6 and are extensions thereof. This formation in cross section, as clearly shown in Fig. 8, is S-shaped.

The flanges 2 are assembled to the hub member without the use of welding or soldering. Each flange 2 is provided with a rectangular aperture 9 of a size and shape to fit the tongues 5. Thus the flanges are definitely located on the hub member 1 by sliding the openings 9 over the tongues 5.

In order to hold the flanges in this assembled position and in order to form trunnions on which the spools may turn, I prefer to provide cylindrical members 10 and 11 which have an internal bore 12 of a size which will fit the tongues 5. These cylindrical members are slid onto the tongues 5 after the flanges 2 are in place and, as indicated in Fig. 11 by the arrows B, pressure is applied by means of a suitable clamp or other apparatus so that the cylindrical members are pressed onto the tongues 5. This securely holds the parts in assembled relation.

I prefer to form one cylindrical member 11 with a gear 13 upon a flange 14 so that the spool may be driven by a pinion in the camera. This permits the spool to be merely dropped into place and into engagement with a driving pinion.

I also prefer to form the tongues 5, as shown in Fig. 11, with the width $w$ of the outer ends of the tongues somewhat greater than the width $w'$ of the inner ends of the tongues. In other words, I prefer these to be slightly wedge-shaped. With the tongues of this shape and with the trunnions 10 pressed onto the tongues, as described above, there is very little possibility of the trunnions pulling off and the spools becoming disassembled.

Referring to Figs. 6 and 7 wherein two forms of film band which may be used with my improved cartridge are shown, the film F, according to Fig. 6, may be provided with a protective paper leader strip 15 to which the film is attached by a paster 16 and may be provided with a similar protective paper trailer 17 to which the film may or may not be attached by a paster 18. The backing papers 15 and 17 are ordinarily connected by a strip running behind the film, although this is not essential.

On the extreme end of the leader strip 15, I prefer to provide a reinforcing strip 19 which extends across the entire width of the leader 15 and across one edge of a notch or opening 20. The trailer strip 17 may be provided with a similar reinforcing member 21.

If a film is used which is provided with an anti-halation backing, it is not always necessary to use a protective paper covering and, according to Fig. 7, the film strip F' may be used without backing paper and the ends may be reinforced by the strips 19 and 21, the former strip as above described, extending across a notch 20 in the end of the film F'.

Where I refer to film band in the following specification and claims, I intend this to be used in the generic sense which includes either a film alone, film and protective paper covering, or film protective paper covering and carbon paper, as the case may be. This term also is intended to include any pasters, such as 16 and 19, which may be included in the convolutions.

Whatever type the film band may take in accordance with my invention it may be very easily and quickly loaded onto the film spool shown in Fig. 1 in the following manner. A complete film cartridge—that is, a film spool wound with convolutions of strip material forming the film band—may be readily threaded into an extremely small camera with very little effort by merely drawing out the extreme end of the film band and as shown in Fig. 8 pressing the end of the band towards the hub member 1 with one finger while the film spool is being turned by the camera winding key in the direction shown by the arrow. When the first notch 7 comes opposite the reinforcing strip 19, the hook-shaped member 8 will project through the aperture 20 in the film band so that these parts become automatically engaged by merely turning the spool.

With a hub constructed as above described, it is only necessary to turn the film spool a half turn to engage a hook 8 with the aperture 20. From this figure, it should also be noted that the aperture 7, extending between the arcuate-shaped member 6 and the flat metal plate 3, is of a width substantially equal to the width of the metallic reinforcing member 19. Thus, when the end of the film band is caught in the winding operation, the strip 19 substantially fills the slot 7 so that the convolutions of strip material can wind smoothly on the spool.

Fig. 5 clearly shows the position of the hook which has engaged the aperture 20. In this position it will be noted that the reinforcing band 19 extends from one flange 2 to the other, thus guiding the backing strip squarely onto the spool and preventing the backing paper from running toward one flange or the other.

As best illustrated in the first four figures, a preferred form of film spool is provided with flanges 2 which, as best shown in Fig. 4, are somewhat dish-shaped and are preferably made of spring metal. Near the periphery of these flanges, I prefer to have a bead 22 of annular shape so that the distance between the peripheries of the flanges 2—2 is somewhat less than over other areas of the flange. The reason for this is that after the convolutions of film band have been wound upon the film spool, the trailer 17 with its reinforcing member 21 are wound between the flanges and since the reinforcing member 21 is preferably a light metal spring strip, it will snap between the annular projections 22 and automatically latch the tail end of the film against unwinding. Thus, it is only necessary to wind the film completely on the take-up roll to fasten the trailer end. This entirely does away with the usual type paster which must be moistened to fasten the film convolutions together.

The reinforcing member 21 and the annular ribs 22 on the spring flanges 2 actually form a spring latch by which the backing paper is held against unwinding.

While I have illustrated and described several embodiments of my invention, it is obvious that the invention is susceptible to a large number of variations so that I contemplate as within the scope of my invention all such forms as may come within the terms of the appended claims.

What I claim as my invention, and desire to be secured by Letters Patent of the United States is:

1. A photographic film spool comprising flanges and a core, said core including a flat plate with arcuate extensions from each edge of the plate, forming a substantially cylindrical core, having two slots in the wall thereof, and a projection extending from one edge of each slot to form a hook-like extension.

2. A photographic film spool comprising flanges and a core, said core including a single flat plate with arcuate extensions from each edge of the plate forming a substantially cylindrical core with slots between the edges of the arcuate extensions and the flat plate, and an edge of an arcuate extension including a hook-like projection.

3. A photographic film spool comprising flanges and a core, said core including a flat plate with arcuate extensions from each edge of the plate, forming a substantially cylindrical core, and an edge of an arcuate extension including a hook-like projection, said projection lying within the arcuate curve of the extension and the substantially cylindrical periphery of the core.

4. A photographic film spool comprising flanges and a core, said core including a flat plate with arcuate extensions from each edge of the plate, and tongues extending from the ends of said plate, each tongue varying in width, said flanges having apertures of dimensions to closely fit the tongues, whereby the flanges may be held against turning upon said core.

5. A photographic film spool comprising flanges and a core, said core including a flat plate with arcuate extensions from each edge of the plate, and tongues extending from the ends of said plate, each tongue having a greater width at a portion thereof spaced from the plate, said flanges having apertures of dimensions to closely fit the tongues and sleeves pressed on the ends of said tongues to retain the flanges in place on the core.

6. A photographic film spool comprising a core, flanges and spool trunnions, said core comprising a flat plate having tongues projecting from the ends, and arcuately curved edges forming a substantially cylindrical wall, said flanges having apertures to engage said tongues, said spool trunnions being pressed upon said tongues holding said flanges in a fixed position on said core.

7. A photographic film spool comprising a core, flanges and spool trunnions, said core comprising a flat plate having tongues projecting from the ends, and arcuately curved edges forming a substantially cylindrical wall, said flanges having apertures to engage said tongues, said spool trunnions being pressed upon said tongues holding said flanges in a fixed position on said core, at least one spool trunnion including a gear wheel.

8. A photographic film spool comprising a core and flanges attached thereto, said core comprising a single piece of metal and being S-shaped in cross section.

9. A photographic film spool comprising a flat plate having its opposite sides symmetrically and arcuately bent to a substantially cylindrical form, tongues extending from the ends of the flat plate, said tongues being of less width near the plate than they are at a point spaced from the plate, flanges having complementary shaped openings engaging said tongues and cylindrical spool trunnions pressed on said tongues, whereby the inside wall of the cylindrical trunnions may tightly engage and hold the flanges on the tongues.

10. A photographic film spool comprising flanges and a core, said core consisting of a single flat piece of metal extending across the medial portion of the spool in a plane transversely thereof, arcuate extensions from the flat part curving in opposite directions from said flat plate and symmetrically arranged to form a partially cylindrical core and leaving slots between the flat part and the arcuate edge of each side thereof.

11. A photographic film spool comprising flanges and a core, said core consisting of a single flat plate extending across the medial portion of the spool in a plane transversely thereof, arcuate extensions from the flat plate curving therefrom in opposite directions to form a substantially cylindrical core with slots between the ends of the arcuate extensions and the flat plate, and means on the flat plate for holding the flanges in a fixed position relative to the core.

12. A photographic film spool comprising flanges and a core, said core consisting of a single flat plate with arcuate extensions curving away from the edges of the flat plate in opposite directions to form a substantially cylindrical core, each of said curved extensions being spaced from the opposite edge of the flat plate from which they are formed leaving oppositely disposed slots in said core, and means for holding the flanges in fixed position relative to the core.

13. A photographic film spool comprising flanges and a core, said core consisting of a single flat plate lying in a plane transversely of the spool and having at its edges arcuate extensions curving in opposite directions from said flat plate, the ends of said arcuate extensions being spaced from opposite edges of said flat plate and leaving slots therebetween, and tongues extending from the edges of the flat plate, said flanges having apertures fitting the tongues adapted to position said flanges of said core.

OTTO WITTEL.